US011080509B2

United States Patent
Yi et al.

(10) Patent No.: US 11,080,509 B2
(45) Date of Patent: Aug. 3, 2021

(54) SYSTEMS AND METHODS FOR ONBOARD FRAUD DETECTION IN A TRANSPORTATION SERVICE

(71) Applicant: DiDi Research America, LLC, Mountain View, CA (US)

(72) Inventors: Xiaoyong Yi, Mountain View, CA (US); Yu Wang, Mountain View, CA (US); Fengmin Gong, Mountain View, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 16/237,016

(22) Filed: Dec. 31, 2018

(65) Prior Publication Data
US 2020/0210678 A1 Jul. 2, 2020

(51) Int. Cl.
*G06K 9/00* (2006.01)
*H04W 76/10* (2018.01)
(Continued)

(52) U.S. Cl.
CPC ......... *G06K 9/00087* (2013.01); *G06Q 50/30* (2013.01); *H04W 4/80* (2018.02); *H04W 76/10* (2018.02)

(58) Field of Classification Search
None
See application file for complete search history.

(56) References Cited

U.S. PATENT DOCUMENTS 8,471,763 B2  6/2013  Daems et al.
9,805,370 B1  10/2017  Quigley et al.
(Continued)

FOREIGN PATENT DOCUMENTS

CN   104869638 A   8/2015
CN   105657659 A   6/2016
(Continued)

OTHER PUBLICATIONS

International Search Report issued in corresponding International Application No. PCT/US2018/068218, dated Apr. 1, 2019, 5 pages.
(Continued)

*Primary Examiner* — Nicholas J Lee
(74) *Attorney, Agent, or Firm* — Bayes PLLC

(57) ABSTRACT

Embodiments of the disclosure provide systems and methods for fraud detection in a transportation service. An exemplary system may include a communication interface configured to receive user data from a terminal device associated with a user providing the transportation service. The user data may include identification information of the terminal device. The system may also include a memory configured to store the user data. The system may also include at least one processor coupled to the memory. The processor may be configured to determine a first fingerprint based on the identification information. The processor may be further configured to determine whether the first fingerprint matches a first reference fingerprint associated with a registered terminal device. Moreover, the processor may be configured to generate a first notice when the first fingerprint does not match the first reference fingerprint.

17 Claims, 5 Drawing Sheets

(51) Int. Cl.
*H04W 4/80* (2018.01)
*G06Q 50/30* (2012.01)

(56) References Cited

U.S. PATENT DOCUMENTS

| | | | |
|---|---|---|---|
| 2014/0213238 | A1 | 7/2014 | Giraud et al. |
| 2016/0300242 | A1 | 10/2016 | Truong |
| 2017/0187707 | A1 | 6/2017 | Miu et al. |
| 2017/0316533 | A1 | 11/2017 | Goldman-Shenhar et al. |
| 2018/0047220 | A1 | 2/2018 | Savoure et al. |
| 2018/0074494 | A1 | 3/2018 | Myers et al. |
| 2018/0074495 | A1 | 3/2018 | Myers et al. |
| 2018/0075565 | A1 | 3/2018 | Myers et al. |
| 2018/0316670 | A1 | 11/2018 | Brown |
| 2018/0322103 | A1* | 11/2018 | Yeo ................... G06F 40/279 |
| 2018/0322352 | A1* | 11/2018 | Phillips ............... H04L 63/0861 |
| 2018/0338229 | A1 | 11/2018 | Nemec et al. |
| 2019/0172279 | A1* | 6/2019 | Al-Shaikh ............... H04L 67/22 |

FOREIGN PATENT DOCUMENTS

| | | |
|---|---|---|
| CN | 106453234 A | 2/2017 |
| CN | 106934627 A | 7/2017 |
| CN | 106997052 A | 8/2017 |
| CN | 107872767 A | 4/2018 |
| WO | 2016164834 A1 | 10/2016 |
| WO | 2017207644 A1 | 12/2017 |

OTHER PUBLICATIONS

Written Opinion of the International Searching Authority issued in corresponding International Application No. PCT/US2018/068218, dated Apr. 1, 2019, 7 pages.
International Search Report issued in corresponding International Application No. PCT/US2018/068214, dated Mar. 29, 2019, 5 pages.
Written Opinion of the International Searching Authority issued in corresponding International Application No. PCT/ US2018/068214, dated Mar. 29, 2019, 6 pages.
International Search Report issued in corresponding International Application No. PCT/US2018/068215, dated Apr. 10, 2019, 5 pages.
Written Opinion of the International Searching Authority issued in corresponding International Application No. PCT/US2018/068215, dated Apr. 10, 2019, 8 pages.

* cited by examiner

SYSTEMS AND METHODS FOR ONBOARD FRAUD DETECTION IN A TRANSPORTATION SERVICE

RELATED APPLICATIONS

This application is related to concurrently filed U.S. application Ser. No. 16/236,970, filed Dec. 31, 2018, entitled "Systems and Methods for Fraud Detection in a Transportation Service" by Xiaoyong Yi, Yu Wang, and Fengmin Gong, and U.S. application Ser. No. 16/237,043, filed Dec. 31, 2018, entitled "Systems and Methods for Device Fingerprint Determination in a Transportation Service" by Xiaoyong Yi, Yu Wang, and Fengmin Gong, both of which are incorporated by reference in their entireties.

TECHNICAL FIELD

The present disclosure relates to systems and methods for fraud detection in a transportation service, and more particularly, to systems and methods for detecting location data fraud and terminal device identification fraud in transportation services.

BACKGROUND

Location data fraud and terminal device identification fraud have negative impact on the fairness and efficiency of transportation services such as ride-hailing (also referred to as ride-sharing) services. For example, transportation service providers (e.g., drivers) registered to a transportation service platform may fake their GPS location information to create fake trips, thus tricking the transportation service platform and make unjustified profit. Fraudsters may also run faked ride-sharing trips to gain awards for accomplishing certain amount of transactions. As each faked mobile device can be assigned to a phone number, using Short Message Service (SMS) to verify is not enough to prevent such fraud activities.

Existing fraud detecting methods collect different types of signal communication channels' features such as Access Points (APs) using a transportation service application and report the collected features back to a cloud server where the signals are analyzed to detect fraud. However, as the signals used for verification are easy to fake but hard to verify, those methods cannot guarantee that the terminal device connected to the cloud is an authenticated terminal device. GPS spoofing detecting methods such as distortion detection require extra components such as detection logics added to the GPS receiver chip and/or antenna. This will increase the cost and complexity to the fraud detecting system and process. Also, detecting fraud on a cloud server would increase the computational burden of the server and may become impractical as the number of users (objects to be detected) increases.

Embodiments of the disclosure address the above problems by methods and systems for fraud detection in a transportation service based on determining one or more fingerprints from user data and comparing the determined fingerprints with reference fingerprints loaded to a service vehicle to enhance detection accuracy and efficiency.

SUMMARY

In one aspect, embodiments of the disclosure provide a system for fraud detection in a transportation service. An exemplary system may include a communication interface configured to receive user data from a terminal device associated with a user providing the transportation service. The user data may include identification information of the terminal device. The system may also include a memory configured to store the user data. The system may also include at least one processor coupled to the memory. The at least one processor may be configured to determine a first fingerprint based on the identification information. The processor may be further configured to determine whether the first fingerprint matches a first reference fingerprint associated with a registered terminal device. Moreover, the processor may be configured to generate a first notice when the first fingerprint does not match the first reference fingerprint.

In another aspect, embodiments of the disclosure provide a method for fraud detection in a transportation service. An exemplary method may include receiving user data from a terminal device associated with a user providing the transportation service. The user data may include identification information of the terminal device. The method may also include determining a first fingerprint based on the identification information and determining whether the first fingerprint matches a first reference fingerprint associated with a registered terminal device. Moreover, the method may include generating a first notice when the first fingerprint does not match the first reference fingerprint.

In a further aspect, embodiments of the disclosure provide a non-transitory computer-readable medium storing instructions that, when executed by one or more processors, cause the one or more processors to perform a method for fraud detection in a transportation service. The method may include receiving user data from a terminal device associated with a user providing the transportation service. The user data may include identification information of the terminal device. The method may also include determining a first fingerprint based on the identification information and determining whether the first fingerprint matches a first reference fingerprint associated with a registered terminal device. Moreover, the method may include generating a first notice when the first fingerprint does not match the first reference fingerprint.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
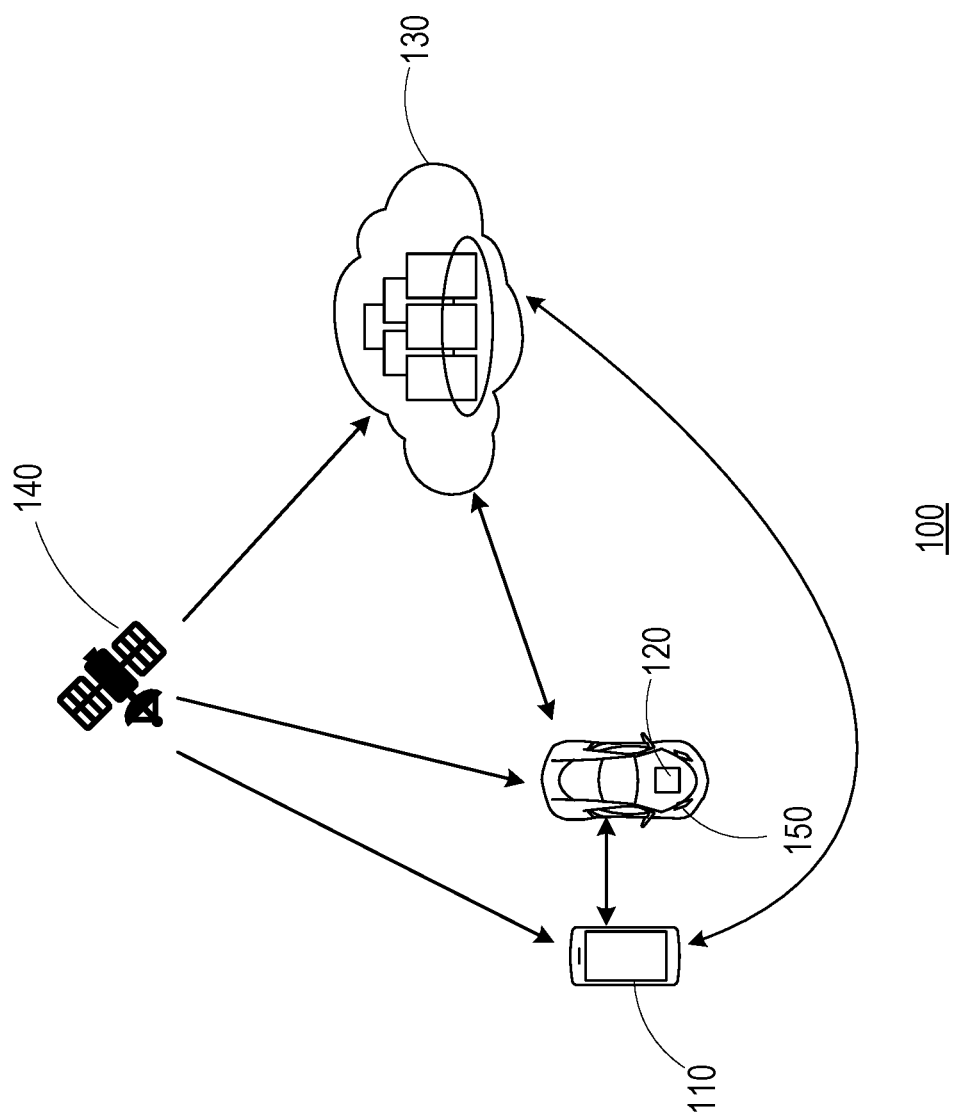
FIG. 1 illustrates a schematic diagram of an exemplary fraud detection system in a transportation service, according to embodiments of the disclosure.

FIG. 1 illustrates a schematic diagram of an exemplary fraud detection system 100 in a transportation service, according to embodiments of the disclosure. As shown in FIG. 1, a service vehicle 150 may be registered to or otherwise associated with a transportation service platform (e.g., a ride-hailing or ride-sharing service platform) to provide transportation service to passengers. Service vehicle 150 may be equipped with a computer system 120, which may be built in, integrated into, installed on, or otherwise associated with service vehicle 150. For example, computer system 120 may be part of service vehicle 150's built-in system that can be configured to perform fraud detection functions disclosed herein. In another example, computer system 120 may be installed as an add-on system after service vehicle 150 is registered to the transportation service platform. In a further example, computer system 120 may be implemented as a combination of components including one or more of built-in system(s), add-on system(s), and user device(s) (e.g., a mobile device that provides computational power, storage space, and/or communication capability).

Computer system 120 may receive positioning data from a transmitter 140 (e.g., a satellite). Transmitter 140 may be part of a geographical positioning system for providing positioning data to receivers, which may decode the positioning data to generate location information, such as geographical coordinates of a location. Computer system 120, a terminal device 110, and/or a server 130 may be equipped with one or more such receivers to receive the positioning data from transmitter 140. In some embodiments, positioning data received from multiple transmitters of the geographical positioning system may be used to determine the location information.

Server 130 may determine a fingerprint of transmitter 140 based on the received position data and may communicate the fingerprint with computer system 120 of service vehicle 150 (e.g., in real time, in a periodic manner, in a request-response manner, etc.). In this case, computer system 120 may store the fingerprint data received from server 130 for fraud detection purposes. In some embodiments, computer system 120 may determine the fingerprint of transmitter 140 locally, for example based on positioning data received directly from transmitter 140 or indirectly from server 130 and/or terminal device 110.

Terminal device 110 may be equipped with one or more receivers to receive positioning data from satellite 140. Terminal device 110 may then decode the positioning data to generate location information. Terminal device 110 may also transmit the received positioning data (e.g., raw data) to computer system 120, which may use the positioning data to determine satellite fingerprint(s) for fraud detection. Terminal device 110 may also communicate with server 130 to facilitate transportation services.

Service vehicle 150 may communicate with terminal device 110 through computer system 120 to authenticate terminal device 110. Service vehicle 150 may also transmit a notice indicating the authentication result to server 130 through computer system 120.

Terminal device 110 may include any suitable device that can interact with a user, e.g., a smart phone, a tablet, a wearable device, a computer, or the like, that can receive positioning signals from satellite 140 (e.g., through a positioning signal receiver equipped therewith). In some embodiments, terminal device 110 may be a standalone device or integrated inside another device, e.g., a vehicle, a mobile phone, a wearable device, a camera, etc. It is contemplated that terminal device 110 may be any kind of movable device or equivalent structures equipped with any suitable satellite navigation module that enables terminal device 110 to obtain satellite signals.

It is contemplated that in some embodiments, satellite 140 may be part of a geographical positioning system such as satellite navigation system. The satellite navigation system may be a global navigation satellite system such as a Global Positioning System (GPS), a Global Navigation Satellite System (GLONASS), a BeiDou-2 Navigation Satellite System (BDS) or a European Union's Galileo system. The satellite navigation system may also be a regional navigation satellite system such as a BeiDou-1 system, a NAVigation with Indian Constellation (NAVIC) system or a Quasi-Zenith Satellite System (QZSS). Terminal device 110 may include a high sensitivity GPS receiver, a conventional GPS receiver, a hand-held receiver, an outdoor receiver, a sport receiver or any of a smart phone, a tablet, a wearable device, a computer, or the like with a satellite navigation module built in. In some embodiments, terminal device 110 may receive signals from satellite 140 directly, through Assisted or Augmented GPS, through an intermediary device (e.g., a cell tower or a station), or via any other communication method that could transmit satellite signals (e.g., satellites broadcast microwave signals) or provide orbital data or almanac for satellite 140 (e.g., Mobile Station Based assistance) to terminal device 110.

Terminal device 110 may be configured to communicate with service vehicle 150 through computer system 120 to facilitate various functions such as transmitting and receiving transportation service requests, playing video/audio contents, making calls, or the like. A transportation service request may include a current location of the passenger, a destination of the requested transportation service, a request time, or the like. Generally, passenger location can be the same or substantially close to a location of the terminal device 110. However, it is contemplated that, passenger location can also differ from the location of the terminal device 110, even if the transportation service request is sent from terminal device 110. For example, a user can request a transportation service from a computer for a friend, who may be distant from this user. In that case, the user may manually provide passenger location on terminal device 110. Location information and/or positioning data associated with a transportation service may be used to determine fraud. For example, computer system 120 may determine a satellite fingerprint or receive a satellite fingerprint determined based on the location information and/or positioning data associated with the transportation service transmitted by and/or received from terminal device 110 or based on satellite signal received from satellite 140.

Consistent with some embodiments, computer system 120 may be a computer physically located within service vehicle 150 (as illustrated in FIG. 1), a virtual server running on a general computer platform of service vehicle 150, part of a distributed server system, or any other suitable computing device. Computer system 120 may also be a general-purpose computer or a proprietary device specially designed for fraud detecting. It is contemplated that, computer system 120 can be a stand-alone system (e.g., a server or a workstation) or an integrated component of a stand-alone system. For example, computer system 120 may be an individual module imbedded into a panel of service vehicle 150. In another example, computer system 120 may be a module built-in another device fixed to or installed on service vehicle 150.

Consistent with some embodiments, service vehicle 150 may be a vehicle configured to provide transportation services. It is contemplated that service vehicle 150 may be an electric vehicle, a fuel cell vehicle, a hybrid vehicle, or a conventional internal combustion engine vehicle. Service vehicle 150 may have a body and at least one wheel. The body may be any body style, such as a sports vehicle, a coupe, a sedan, a pick-up truck, a station wagon, a sports utility vehicle (SUV), a minivan, or a conversion van. In some embodiments, service vehicle 150 may include a pair of front wheels and a pair of rear wheels. However, it is contemplated that service vehicle 150 may have more or less wheels or equivalent structures that enable service vehicle 150 to move around. Service vehicle 150 may be configured to be all-wheel drive (AWD), front wheel drive (FWR), or rear wheel drive (RWD). In some embodiments, service vehicle 150 may be configured to be operated by an operator occupying the vehicle, remotely controlled, and/or autonomous.

Terminal device 110 may be connected to computer system 120 of service vehicle 150 via a direct link or through a network, such as a Wireless Local Area Network (WLAN), a Wide Area Network (WAN), wireless networks such as radio waves, a cellular network, a satellite communication network, and/or a local or short-range wireless network (e.g., Bluetooth™ or near-field communication) for transmitting transportation service-related information.

Service vehicle 150 may be configured to communicate with server 130 through computer system 120. In some embodiments, server 130 may be a cloud server (as illustrated in FIG. 1), a virtual server, a distributed server, or any other suitable computing device. Server 130 may also include a general-purpose server or a proprietary device specially designed for fraud detecting. It is contemplated that, server 130 can be a stand-alone system (e.g., a server) or an integrated component of a stand-alone server. In some embodiments, computer system 120 may determine if a fingerprint determined based on user data received from terminal device 110 matches with a reference fingerprint, generate a notification if the determined fingerprint does not match the reference fingerprint, and transmit the notification to server 130.

Figure 2:
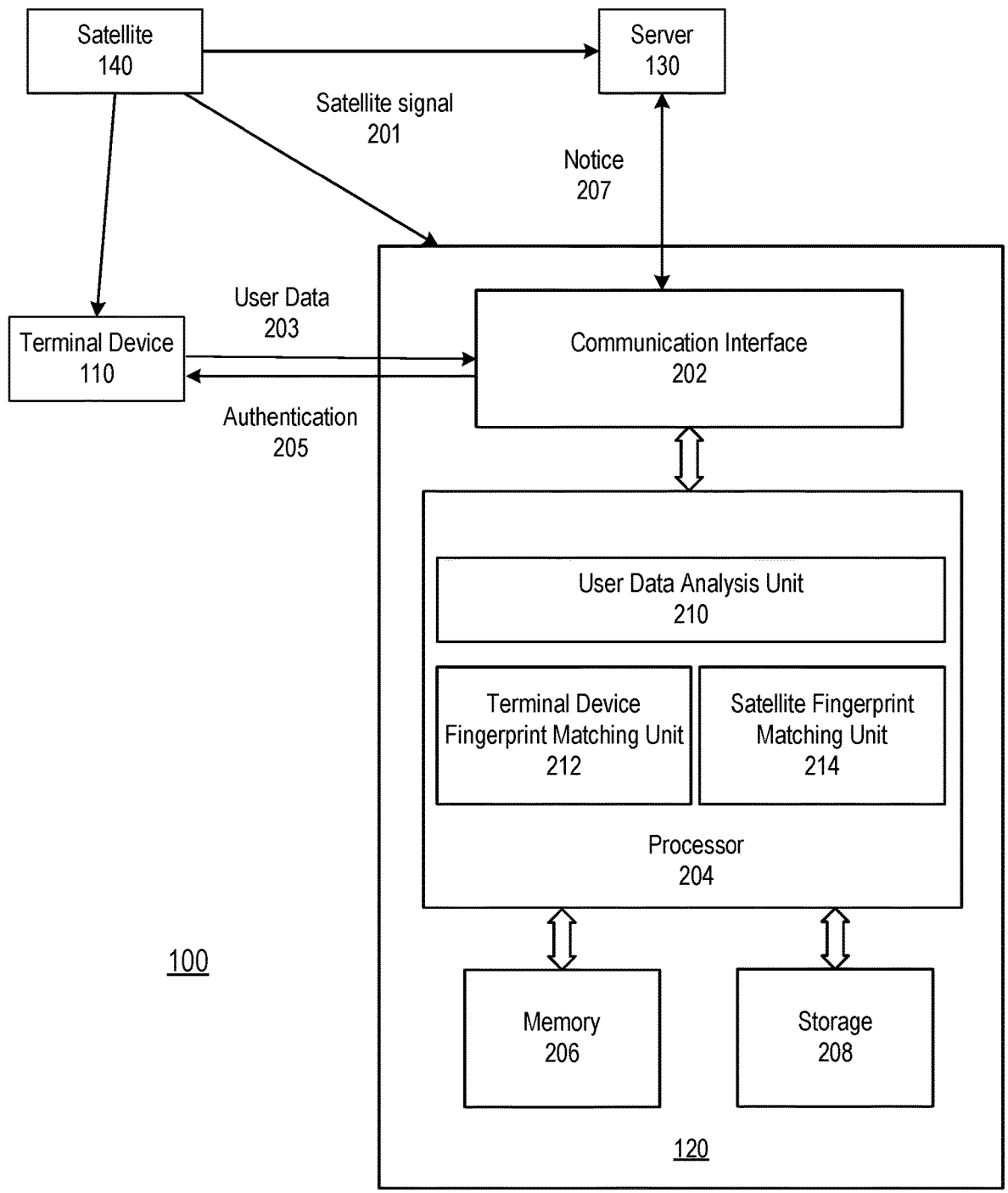
FIG. 2 illustrates a block diagram of an exemplary fraud detection system, according to embodiments of the disclosure.

FIG. 2 illustrates a block diagram of system 100, according to embodiments of the disclosure. Consistent with the present disclosure, computer system 120 may receive satellite signal 201 from satellite 140 and receive user data 203 from terminal device 110. If computer system 120 determines that terminal device is authenticated, computer system 120 may transmit an authentication 205 to terminal device 110. Computer system 120 may also transmit a notice 207 indicating the authentication result to server 130. Computer system 120 may be configured to determine a fingerprint based on received user data 203 and compare the determined fingerprint with a reference fingerprint to detect fraudulent activities in a transportation service.

In some embodiments, as shown in FIG. 2, computer system 120 may include a communication interface 202, a processor 204, a memory 206, and a storage 208. In some embodiments, computer system 120 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of computer system 120 may be located in a single location or distributed locations. Components of computer system 120 may be in an integrated device or distributed at different locations but communicate with each other through a network (not shown).

Communication interface 202 may send data to and/or receive data from components such as terminal device 110, server 130, and satellite 140 via, for example, a positioning data receiver, communication cables, a Wireless Local Area Network (WLAN), a Wide Area Network (WAN), wireless networks such as radio waves, a cellular network, satellite communication links, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data such as satellite data (e.g., satellite signal 201) from satellite 140 as well as user data 203 from terminal device 110. For example, communication interface 202 may communicate with terminal device 110 by establishing a short-range communication (e.g., near-field communication or Bluetooth™ communication). In some embodiments, communication interface 202 may also transmit notice 207 including the result of authenticating terminal device 110 to server 130. Communication interface 202 may further provide any received data to memory 206/storage 208 for storage or to processor 204 for processing. After processor 204 authenticates/verifies a transportation service, communication interface 202 may send an authentication (e.g., authentication 205) to terminal device 110 or any remote device via a network.

Processor 204 may include any appropriate type of general-purpose or special-purpose microprocessor, digital signal processor, or microcontroller. Processor 204 may be configured as a separate processor module dedicated to fraud detecting in a transportation service. Alternatively, processor 204 may be configured as a shared processor module for performing other functions unrelated to fraud detecting.

As shown in FIG. 2, processor 204 may include multiple modules, such as a user data analysis unit 210, a terminal device fingerprint matching unit 212, a satellite fingerprint matching unit 214, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-214 all within one processor 204, it is contemplated that these units may be distributed among multiple processors located close to or remotely with each other.

After receiving user data 203 from terminal device 110, user data analysis unit 210 may analyze user data 203 to extract relevant information for detecting fraudulent activities. In some embodiments, user data 203 may include identification information of terminal device 110. Based on the identification information, user data analysis unit 210 may determine a terminal device fingerprint of terminal device 110 such as Bluetooth™ fingerprint, International Mobile Equipment Identity (IMEI) of terminal device 110, or the like. Based on the determined terminal device fingerprint, terminal device fingerprint matching unit 212 may be configured to compare the determined terminal device fingerprint of terminal device 110 with a reference terminal device fingerprint that is predetermined and stored in storage 208. In some embodiments, the terminal device fingerprint may be associated with a phone number, a Bluetooth™ fingerprint, an International Mobile Equipment Identity (IMEI), or any other information indicating an identity of the terminal device. In some embodiments, the reference terminal device fingerprint may be acquired any time before terminal device 110 initiates a transportation service. For example, a Bluetooth™ fingerprint reader or scanner may be used to determine the Bluetooth™ fingerprint of a terminal device associated with service vehicle 150 when service vehicle 150 is registered for providing transportation services. The Bluetooth™ fingerprint reader or scanner may transmit the determined Bluetooth™ fingerprint to computer system 120 and store the fingerprint in memory 206 and/or storage 208 as a reference terminal device fingerprint for fraud detection purposes.

In some embodiments, the fingerprint of terminal device 110 may also be determined by terminal device 110 and may be transmitted to terminal device fingerprint matching unit 212 for matching purposes. For example, terminal device 110 may have a certain application or a module within the transportation service application installed thereon that may extract the information indicating the identity of a terminal device and determine the terminal device fingerprint based on the information.

In some embodiments, user data analysis unit 210 may determine the terminal device fingerprint based on identification information included in user data 203 and may provide the determined fingerprint to terminal device fingerprint matching unit 212 for matching purposes. For example, communication interface 202 may establish a connection with terminal device 110. User data analysis unit 210 may determine the terminal device fingerprint of terminal device 110 based on information exchanged with terminal device 110 (e.g., user data 203) through the connection. In some embodiments, user data analysis unit 210 may extract the information indicating the identity of terminal device 110. For example, communication interface 202 may establish a Bluetooth™ communication with terminal device 110. User data analysis unit 210 may determine a Bluetooth™ fingerprint of terminal device 110 based on the Bluetooth™ signals received from terminal device 110. In another example, user data 203 may include information indicating the International Mobile Equipment Identity (IMEI) of terminal device 110. User data analysis unit 210 may determine the terminal device fingerprint (e.g., IMEI in this scenario) based on user data 203.

In some embodiments, terminal device fingerprint matching unit 212 may compare and/or match the terminal device fingerprint with the reference terminal device fingerprint. For example, terminal device fingerprint matching unit 212 may use the rise time signature of the terminal device to match the reference terminal device fingerprint. In some embodiments, physical layer fingerprints (physical layer authentication solutions) may be used to match the terminal device fingerprint of terminal device 110 with the reference terminal device fingerprint.

When terminal device fingerprint matching unit 212 determines that the terminal device fingerprint does not match the reference terminal device fingerprint, terminal device fingerprint matching unit 212 may generate a notice indicating a potential fraud committed on terminal device 110. Terminal device fingerprint matching unit 212 may also trigger a fraud alert. In some embodiments, the transportation service may be terminated based on the notice. In some embodiments, the fraud alert may be transmitted to the transportation service platform (e.g., server 130) for the platform to take further actions (e.g., disfranchising the license of the fraudsters, contacting third party authorities such as local police stations, etc.). In some embodiments, the fraud alert may be transmitted to both the transportation service provider and a rider (not shown) for safety reasons. On the other hand, when terminal device fingerprint matching unit 212 determines that the terminal device fingerprint matches the reference terminal device fingerprint, terminal device fingerprint matching unit 212 may authenticate terminal device 110. In some embodiments, terminal device fingerprint matching unit 212 may transmit, through communication interface 202, authentication 205 back to terminal device 110 indicating that the identity of terminal device 110 is authenticated.

In some embodiments, user data 203 may include a location associated with the transportation service (e.g., a location of the terminal device 110 provided by terminal device 110) and positioning data of a geographical positioning system (e.g., raw data received by terminal device 110 from the satellite(s) of the geographical position system). User data analysis unit 210 may first extract positioning data from user data 203 and determine a satellite fingerprint of a satellite from which terminal device 110 receives the signal. For example, User data analysis unit 210 may use the extracted positioning data to determine the fingerprint of the satellite (e.g., the actual satellite that transmits raw data to terminal device 110) based on the precise positioning service (PPS) code and/or the standard positioning service (SPS) code used to modulate the carrier signal of a GPS satellite navigational positioning and identification information. In another example, the satellite fingerprint may also be identified based on the 50 bit per second (bps) message used to modulate the GPS signal that includes primarily the orbit and timing information of the satellite. Because it is relatively hard to alter the positioning data (e.g., raw data received from a satellite), the positioning data (e.g., as part of the user data 203) received from terminal device 110 may contain information of the satellite that actually sends signals to terminal device 110. Therefore, the satellite fingerprint determined from the raw satellite data may reveal information of the actual satellite that transmits signals to terminal device 100. The determined satellite fingerprint may be provided to satellite fingerprint matching unit 214 for further processing.

User data analysis unit 212 may also extract a location associated with the transportation service from user data 203 and determine, based on the location, a proper reference satellite fingerprint for matching purposes.

The reference satellite fingerprint of a satellite may be determined based on the satellite data (e.g., satellite signal 201) received from satellite 140 ahead of the commencing of the transportation service by computer system 120 or other devices. The reference satellite fingerprint may be stored in storage 208 (e.g., in a form of lookup table or other types of databases) for reference purposes. In some embodiments, satellite fingerprints of one or more satellites used to provide positioning data to a geographical area over a certain time period may be determined and stored as reference fingerprints to identify the satellites. For example, in city A, all the GPS positioning information acquired may be received from a set of satellite B1, B2, . . . , Bn over a certain time period (e.g., in a day, over a few hours, etc.). In this case, the satellite fingerprints of satellites B1, B2, . . . , Bn may be determined based on raw data received from these satellites and stored as reference fingerprints to uniquely identify satellites B1, B2, . . . , Bn, if computer system 120 is used for detecting fraud in city A over the specified time period. In some embodiments, satellite fingerprint may be determined based on an amplitude profile and/or a phase profile included in the satellite raw data. For example, the fingerprint of a satellite may be determined based on the precise positioning service (PPS) code and/or the standard positioning service (SPS) code used to modulate the carrier signal of a GPS satellite navigational positioning and identification information. In another example, a satellite fingerprint may also be identified based on the 50 bit per second (bps) message used to modulate the GPS signal that includes primarily the orbit and timing information of the satellite. In some embodiments, the determined satellite fingerprint(s) may be stored in memory 206 and/or storage 208 as reference satellite fingerprint(s).

The location extracted from user data 130 is supposedly decoded by terminal device 110 from satellite signals but may be tampered. For example, terminal device 110 may bypass the actual location decoded from actual satellite signals and replace the actual location with a fake one. In this case, the fake location may be included in user data 203 and received by communication interface 202. Based on the received location (may or may not be the actual location), satellite fingerprint matching unit 214 may determine one or more satellites that in fact provide positioning service to that received location and determine the fingerprint(s) of the corresponding satellite(s). For example, user data may include location L and positioning data P. Positioning data P may be raw data received by terminal device 110 from one or more satellites, such as a satellite S1. Positioning data P are relatively hard to alter so they are considered authentic data. Location L is a location (e.g., geographical coordinates) decoded by terminal device 110 indicating the current location of terminal device 110. Comparing to positioning data P, location L is relatively easy to alter. Suppose location L is a fake location, then it is likely that the satellite(s) corresponding to the fake location L (e.g., the satellite(s) providing positioning data that, after decoding, yield the fake location L) is different from satellite S1. By comparing the fingerprint of the satellite corresponding to the raw positioning data and the fingerprint of the satellite corresponding to the location, computer system 120 may determine if the location provided by terminal device 110 is authentic or fake.

In some embodiments, after receiving the satellite fingerprint determined from positioning data, satellite fingerprint matching unit 214 may determine whether the satellite fingerprint matches with a reference satellite fingerprint. The reference satellite fingerprint may be pre-determined and stored in storage 208. For example, if the location indicates a location L, the fingerprint(s) of one or more satellites that provide positioning service/signals to location L may be determined and selected as reference fingerprint(s). In some other embodiments, satellite fingerprint matching unit 214 may compare the precise positioning service (PPS) code and/or the standard positioning service (SPS) used to modulate satellite signal 201 and the positioning data in user data 203. For example, satellite fingerprint matching unit 214 may determine whether the orbit and/or the timing information associated with satellite signal 201 and the positioning data in user data 203 match. If satellite fingerprint matching unit 214 determine that the satellite fingerprint determined from positioning data does not match the reference satellite fingerprint, satellite fingerprint matching unit 214 may generate a second notice. In some embodiments satellite fingerprint matching unit 214 may further trigger a second fraud alert and/or may terminate the transportation service when the second notice is generated. In some embodiments, the fraud alert may be transmitted to the transportation service platform (e.g., server 130) for the platform to take further actions (e.g., disfranchising the license of the fraudsters, contacting third party authorities such as local police stations, etc.). In some other embodiments, the fraud alert may be transmitted to both the transportation service provider and/or a rider (not shown) for safety protection reasons. On the other hand, if the satellite fingerprint determined from the positioning data matches the reference satellite fingerprint, satellite fingerprint matching unit 214 may authenticate the location associated with the transportation service. In some embodiments, satellite fingerprint matching unit 214 may, through communication interface 202, transmit authentication 205 back to terminal device 110, indicating that the location associated with the transportation service is authenticated.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform fraud detecting herein. For example, memory 206 and/or storage 208 may be configured to store program(s) that may be executed by processor 204 to determine satellite fingerprints based on satellite signal.

Memory 206 and/or storage 208 may be further configured to store information and data used by processor 204. For instance, memory 206 and/or storage 208 may be configured to store the various types of data (e.g., user data, terminal device fingerprint(s), satellite fingerprint(s), reference fingerprints, etc.). The data may be transmitted by terminal device 110, satellite 140, and/or server 130, or may be generated by computer system 120. Memory 206 and/or storage 208 may also store intermediate data such as reference satellite signal, and matching results, etc. The various types of data may be stored permanently, removed periodically, or disregarded immediately after each frame of data is processed.

Figure 3:
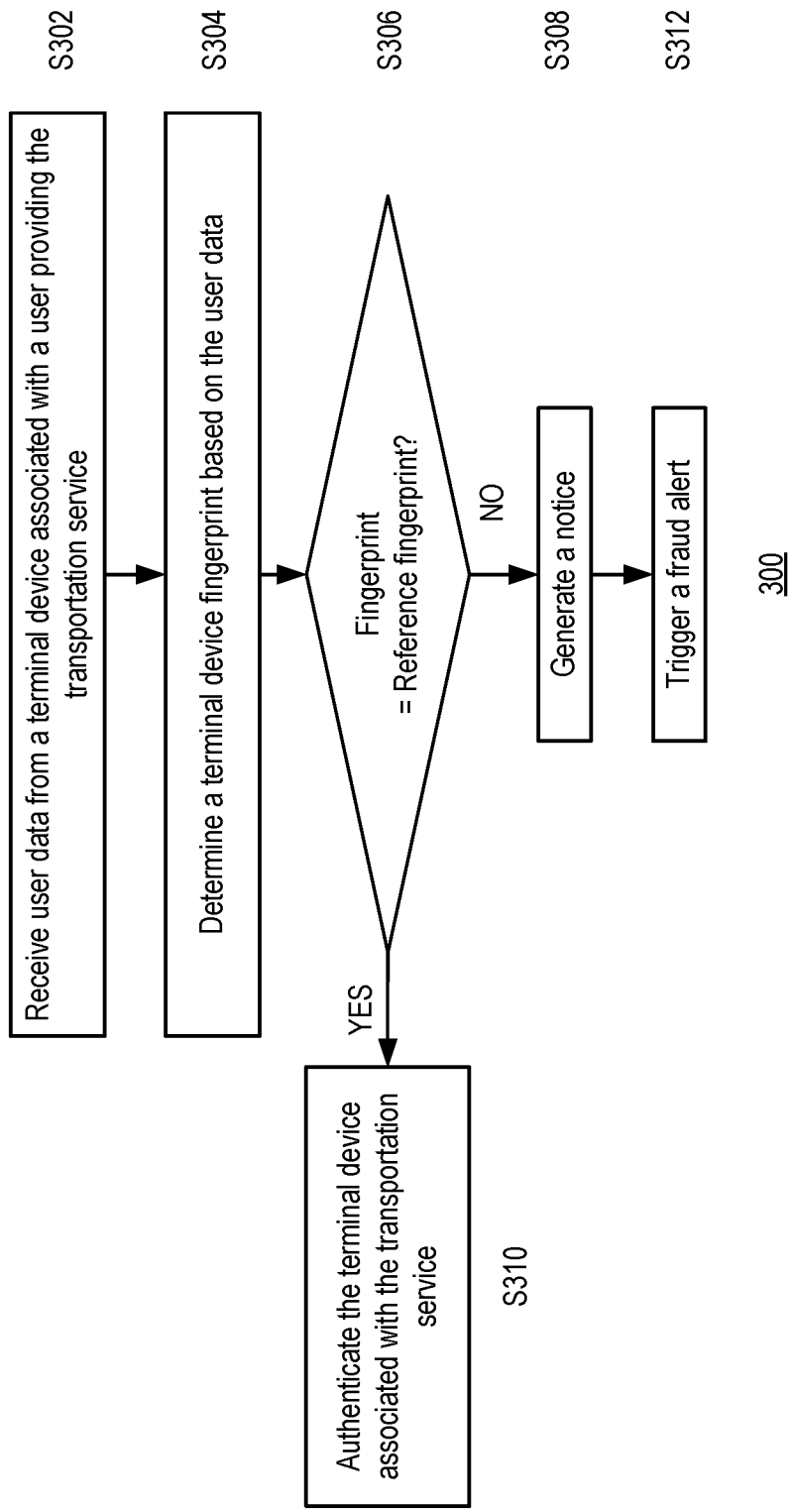
FIG. 3 illustrates a flowchart of an exemplary method for fraud detection in a transportation service, according to embodiments of the disclosure.

FIG. 3. illustrates a flowchart of an exemplary method 300 for fraud detection in a transportation service, according to embodiments of the disclosure. In some embodiments, method 300 may be implemented by computer system 120. However, method 300 is not limited to that exemplary embodiment and may be implemented jointly by computer system 120, terminal device 110, and/or server 130. Method 300 may include steps S302-S312 as described below. It is to be appreciated that some of the steps may be optional to perform the disclosure provided herein. Further, some of the steps may be performed simultaneously, or in a different order than shown in FIG. 3.

In step S302, computer system 120 may receive user data 203 from terminal device 110. User data 203 may include identification information. For example, computer system 120 may establish a short-range communication such as a Bluetooth™ connection or near-field communication with terminal device 110 and receive user data 203 from terminal device 110 through the established communication.

In step S304, computer system 120 may determine a terminal device fingerprint associated with a user of the transportation service based on the information exchanged (e.g., with terminal device 110). For example, the service vehicle may have an individual module or a module built-in another device that can extract the information indicating the identity of the terminal device (e.g., the service vehicle may establish a Bluetooth™ communication link with the terminal device and determine the Bluetooth™ fingerprint of the terminal device based on the Bluetooth™ signals received from the terminal device).

In step S306, computer system 120 may determine if the terminal device fingerprint matches a reference terminal device fingerprint. For example, computer system 120 may use the rise time signature of the terminal device to match the reference fingerprint. In some embodiments, physical layer fingerprints (physical layer authentication solutions) may be used to match the fingerprint of the terminal device and the reference fingerprint.

In some embodiments, the reference fingerprint may be acquired any time before the terminal device initiates a transportation service. For example, a Bluetooth™ fingerprint reader or scanner may be used to determine the Bluetooth™ fingerprint of a terminal device associated with service vehicle 150 when the terminal device is registered to facilitate transportation services. The Bluetooth™ fingerprint reader or scanner may transmit the determined Bluetooth™ fingerprint to computer system 120, which may store the fingerprint in storage 208 as the reference fingerprint of the registered terminal device for matching purposes.

In some embodiments, if computer system 120 determines that the fingerprint does not match the reference fingerprint, method 300 proceeds to step S308, in which computer system 120 may generate a notice indicating that terminal device 110 is not authenticated.

In step S312, computer system 120 may trigger a fraud alert and/or may terminate the transportation service. In some embodiments, the notice may be transmitted to the transportation service platform (server 130) for the platform to take further actions (e.g., initiating a fraud alert, disfranchising the license of the fraudsters, contacting third party authorities such as local police stations, etc.). In some embodiments, the fraud alert may also be transmitted to both the transportation service provider and a rider (not shown) for safety reasons.

In some embodiments, if computer system 120 determines that fingerprint does match the reference fingerprint, method 300 proceeds to step S310, in which computer system 120 may authenticate terminal device 110. In some embodiments, computer system 120 may transmit an authentication (e.g., authentication 205) back to terminal device 110 indicating that terminal device 110 is authenticated.

Figure 4:
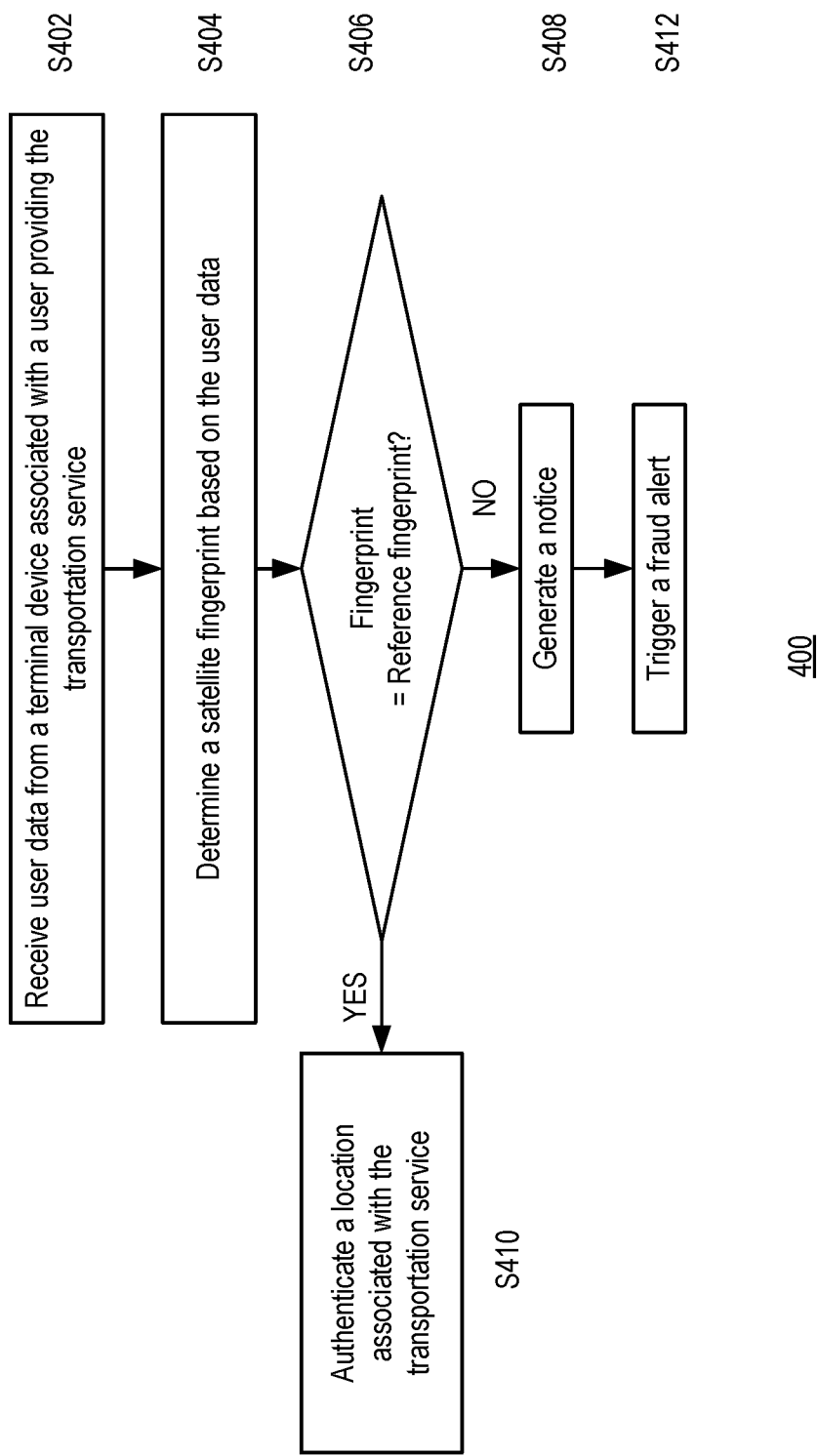
FIG. 4. illustrates a flowchart of another exemplary method for fraud detection in a transportation service, according to embodiments of the disclosure

FIG. 4 illustrates a flowchart of an exemplary method for fraud detection in a transportation service, according to embodiments of the disclosure. In some embodiments, method 400 may be implemented by computer system 120. However, method 400 is not limited to that exemplary embodiment and may be implemented jointly by computer system 120, terminal device 110, and/or server 130. Method 400 may include steps S402-S412 as described below. It is to be appreciated that some of the steps may be optional to perform the disclosure provided herein. Further, some of the steps may be performed simultaneously, or in a different order than shown in FIG. 4.

In step S402, computer system 120 may receive user data from terminal device 110 associated with a user providing the transportation service. For example, user data may include a location associated with the transportation service (e.g., location the service vehicle provided by terminal device 110) and positioning data of a geographical positioning system (e.g., raw data received from satellite(s) by terminal device 110). The user data may be preprocessed to reduce data irrelevant to satellite fingerprint determination process to provide positioning data to the next step.

In step S404, computer system 120 may determine a satellite fingerprint based on the positioning data included in the user data. For example, computer system 120 may use the positioning data such as the raw data received from satellite(s) by terminal device 110 to determine a satellite fingerprint of a satellite from which the terminal device actually received the signal. For example, computer system 120 may determine the fingerprint of the satellite based on the precise positioning service (PPS) code and/or the standard positioning service (SPS) code used to modulate the carrier signal of a GPS satellite navigational positioning and identification information. In another example, satellite fingerprint may be determined based on the 50 bit per second (bps) message used to modulate the GPS signal that includes primarily the orbit and timing information of the satellite.

In step S406, computer system 120 may determine if the determined satellite fingerprint matches a reference fingerprint. For example, the reference fingerprint may be determined based on the location received from terminal device 110 by identifying a satellite that provides positioning service/signals to the location in the relevant time period when the location information is received from or generated by terminal device 110. Computer system 120 may compare the precise positioning service (PPS) code and/or the standard positioning service (SPS) used to modulate satellite signals of the reference satellite and the fingerprint determined from the positioning data in user data 203. In another example, computer system 120 may determine whether the orbit and/or the timing information associated with satellite signal of the reference satellite and the fingerprint determined from the positioning data in the user data 203 match.

In some embodiments, if computer system 120 determines that the determined satellite fingerprint does not match the reference satellite fingerprint, method 400 proceeds to step S408, in which computer system 120 may generate a notice indicating that the location provided by terminal device 110 is not authenticated.

In step S412, computer system 120 may trigger a fraud alert and/or may terminate the transportation service. In some embodiments, the notice may be transmitted to the transportation service platform (e.g., server 130) for the platform to take further actions (e.g., initiating a fraud alert, disfranchising the license of the fraudsters, contacting third party authorities such as local police stations, etc.). In some embodiments, the fraud alert may be transmitted to both the transportation service provider and a rider (not shown) for safety reasons.

When the determined fingerprint matches the reference fingerprint, method 400 proceeds to step S410, in which computer system 120 may authenticate the location associated with the transportation service. In some embodiments, computer system 120 may transmit an authentication back to terminal device 110 indicating that the location associated with the transportation service is authenticated.

Figure 5:
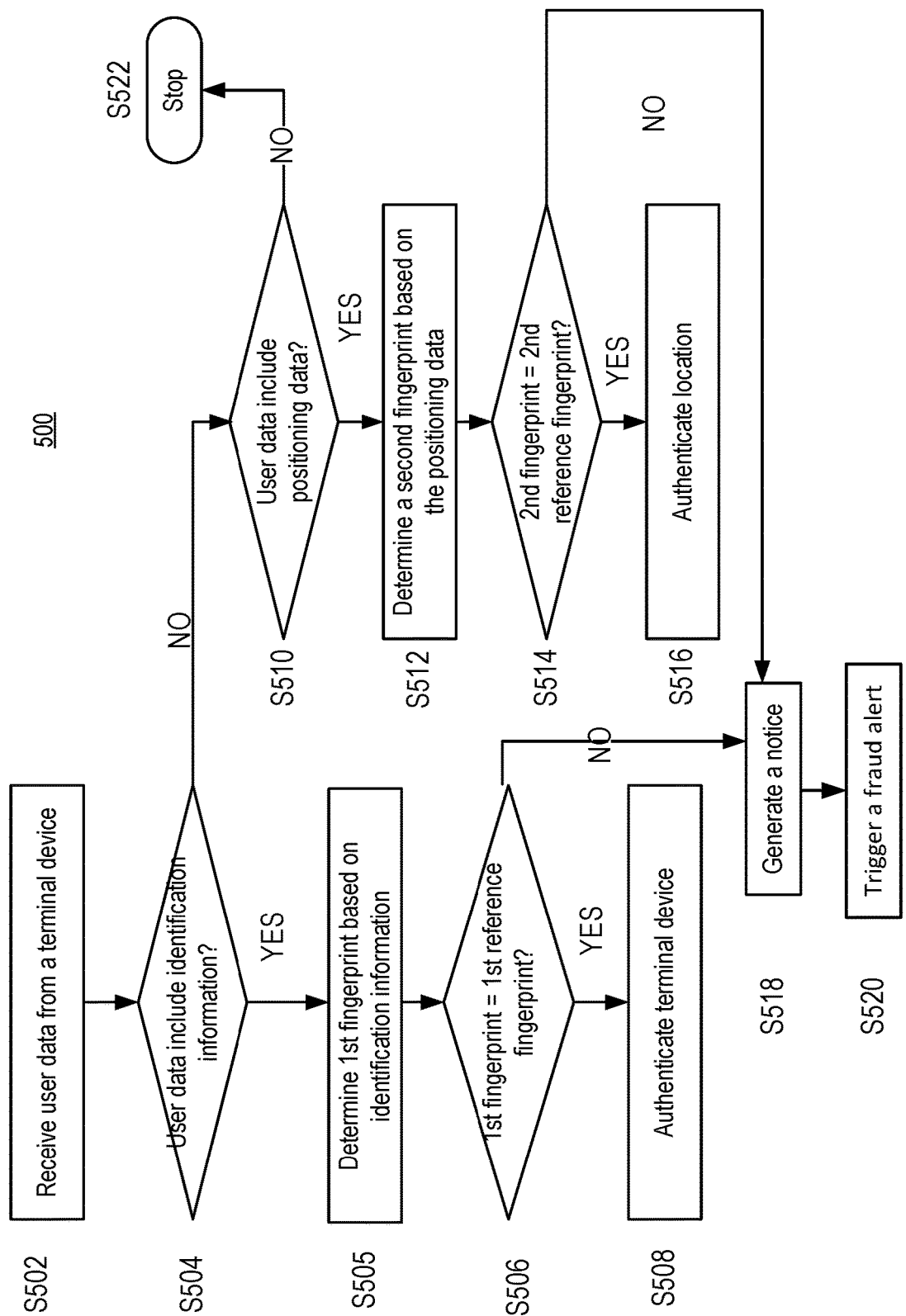
FIG. 5 illustrates a flowchart of a further exemplary method for fraud detection in a transportation service, according to embodiments of the disclosure

FIG. 5 illustrates a flowchart of another exemplary method for fraud detection in a transportation service, according to embodiments of the disclosure. In some embodiments, method 500 may be implemented by computer system 120. However, method 500 is not limited to that exemplary embodiment and may be implemented jointly by computer system 120, terminal device 110, and/or server 130. Method 500 may include steps S502-S522 as described below. It is to be appreciated that some of the steps may be optional to perform the disclosure provided herein. Further, some of the steps may be performed simultaneously, or in a different order than shown in FIG. 5.

In step S502, computer system 120 may receive user data from a terminal device (e.g., terminal device 110) associated with a user providing the transportation service. For example, user data may include a location associated with the transportation service (e.g., location of the service vehicle provided by terminal device 110), positioning data of a geographical positioning system (e.g., raw data received from satellite(s) by terminal device 110) and information indicating the identity of the terminal device such as a phone number, a Bluetooth™ signal, an International Mobile Equipment Identity (IMEI), etc.

In step S504, computer system 120 may determine if the user data include identification information. If yes, method 500 proceeds to step S505, in which computer system 120 may determine a first fingerprint based on the identification information. For example, computer system 120 may determine a Bluetooth™ fingerprint based on the Bluetooth™ signals received from terminal device 110. In another example, computer system 120 may determine a terminal device fingerprint based on IMEI and/or phone number of terminal device 110.

In step S506, computer system 120 may determine if the first fingerprint matches a first reference terminal device fingerprint. For example, computer system 120 may use the rise time signature of terminal device 110 to perform fingerprint matching. In some embodiments, physical layer fingerprints (physical layer authentication solutions) may be used to match the first fingerprint with the first reference fingerprint.

In some embodiments, the reference fingerprint may be acquired any time before the terminal device initiates a transportation service. For example, a Bluetooth™ fingerprint reader or scanner may be used to determine the Bluetooth™ fingerprint of a terminal device associated with service vehicle 150 when the terminal device is registered to facilitate transportation services. The Bluetooth™ fingerprint reader or scanner may transmit the determined Bluetooth™ fingerprint to computer system 120, which may store the fingerprint in storage 208 as the reference fingerprint of the registered terminal device for further matching purposes.

If computer system 120 determines that the first fingerprint does match the first reference fingerprint, method 500 proceeds to step S508, in which computer system 120 may authenticate terminal device 110. In some embodiments, computer system 120 may transmit an authentication back to terminal device 110 indicating that the terminal device is authenticated.

Otherwise, if computer system 120 determines that the first fingerprint does not match the first reference fingerprint, method 500 proceeds to step S518, in which computer system 120 may generate a notice indicating that terminal device 110 is not authenticated.

In step S520, computer system 120 may trigger a fraud alert and/or may terminate the transportation service. In some embodiments, the notice may be transmitted to the transportation service platform (e.g., server 130) for the platform to take further actions (e.g., initiating a fraud alert, disfranchising the license of the fraudsters, contacting third party authorities such as local police stations, etc.). In some embodiments, the fraud alert may be transmitted to both the transportation service provider and a rider (not shown) for safety reasons.

Referring back to step S504, if computer system 120 determines that user data 203 does not include any identification information, method 500 proceeds to step S510 where computer system 120 may determine if the user data include positioning data. If user data 203 also do not include positioning data, method 500 proceeds to step S522, in which computer system 120 stops the fraud detection process.

If user data 203 include positioning data, method 500 proceeds to step S512, in which computer system 120 may determine a second fingerprint (e.g., a satellite fingerprint) based on positioning data included in the user data. For example, computer system 120 may use the positioning data such as the raw data received from satellite(s) by terminal device 110 to determine a satellite fingerprint of a satellite from which the terminal device actually received the signal. For example, computer system 120 may determine the fingerprint of the satellite based on the precise positioning service (PPS) code and/or the standard positioning service (SPS) code used to modulate the carrier signal of a GPS satellite navigational positioning and identification information. In another example, satellite fingerprint may be determined based on the 50 bit per second (bps) message used to modulate the GPS signal that includes primarily the orbit and timing information of the satellite.

In step S514, computer system 120 may determine if the second fingerprint matches a second reference fingerprint. For example, the second reference fingerprint may be determined based on the location received from terminal device 110 by identifying a satellite that provides positioning service/signals to the location in the relevant time period when the location is received from or generated by terminal device 110. Computer system 120 may compare the precise positioning service (PPS) code and/or the standard positioning service (SPS) used to modulate the fingerprint determined from the positioning data in user data 203 with the reference fingerprint. In another example, computer system 120 may determine whether the orbit and/or the timing information associated with satellite signal of the reference satellite and the fingerprint determined from the positioning data in user data 203 matches.

If computer system 120 determines that the satellite fingerprint determined from the positioning data does not match the reference satellite fingerprint, method 500 proceeds to step S518 and step S520, in which computer system 120 may generate a notice indicating that the location provided by terminal device 110 is not authenticated and trigger a fraud alert and/or may terminate the transportation service based on the notice. In some embodiments, the notice may be transmitted to the transportation service platform (e.g., server 130) for the platform to take further actions (e.g., initiating a fraud alert, disfranchising the license of the fraudsters, contacting third party authorities such as local police stations, etc.). In some embodiments, the fraud alert may be transmitted to both the transportation service provider and the rider (not shown) for safety reasons.

In method 500, steps S510-S516 may also be performed in parallel to, or as in addition to steps S504-S508, to provided additional reliability and robustness.

In methods 300, 400 and 500 disclosed herein, as fingerprint matching processes are done mostly by computer system 120 (e.g., a local system of service vehicle 150), the computational resources of server 130 may be spared. Thus, the method disclosed herein may improve the scalability of fraud detection and may be more suitable for handling a large amount of user data.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system, equipped on a service vehicle registered to provide a transportation service, for fraud detection, the system comprising:
   a communication interface equipped on the service vehicle, the communication interface being configured to communicate with a terminal device associated with a user;
   a memory equipped on the service vehicle and storing instructions; and
   at least one processor equipped on the service vehicle and coupled to the memory and the communication interface, wherein the at least one processor is configured to execute the instructions to:
      control the communication interface equipped on the service vehicle to establish a short-range communication link with the terminal device associated with the user;
      receive short-range communication signals from the terminal device through the short-range communication link;
      determine a terminal device fingerprint based on the short-range communication signals received from the terminal device;
      determine whether the terminal device fingerprint matches a reference terminal device fingerprint corresponding to a registered terminal device that is registered to provide the transportation service using the service vehicle; and
      generate a first notice when the terminal device fingerprint does not match the reference terminal device fingerprint.

2. The system of claim 1, wherein the at least one processor is further configured to trigger a first fraud alert based on the first notice.

3. The system of claim 1, wherein the at least one processor is further configured to authenticate the terminal device when the terminal device fingerprint matches the reference terminal device fingerprint.

4. The system of claim 1, wherein the reference terminal device fingerprint is determined based on identification information of the registered terminal device.

5. The system of claim 1, wherein
   the at least one processor is further configured to:
      receive location information of the terminal device and positioning data of a geographical positioning system;
      determine a transmitter fingerprint of a transmitter of the geographical positioning system based on the positioning data;
      determine a reference transmitter fingerprint based on the location information;
      determine whether the transmitter fingerprint matches the reference transmitter fingerprint; and
      generating a second notice when the transmitter fingerprint does not match the reference transmitter fingerprint.

6. The system of claim 5, wherein the at least one processor is further configured to trigger a second fraud alert based on the second notice.

7. The system of claim 5, wherein the at least one processor is further configured to:
   determine a reference transmitter of the geographical positioning system corresponding to the location information; and
   determine the reference transmitter fingerprint based on the reference transmitter.

8. The system of claim 5, wherein the at least one processor is further configured to authenticate the location information when the transmitter fingerprint matches the reference transmitter fingerprint.

9. A method, implemented by an onboard computer system equipped on a service vehicle registered to provide a transportation service, for fraud detection, the method comprising:
   establishing a short-range communication link with a terminal device associated with a user;
   receiving short-range communication signals from the terminal device through the short-range communication link;
   determining a terminal device fingerprint based on the short-range communication signals received from the terminal device;
   determining whether the terminal device fingerprint matches a reference terminal device fingerprint corresponding to a registered terminal device that is registered to provide the transportation service using the service vehicle; and
   generating a first notice when the terminal device fingerprint does not match the reference terminal device fingerprint.

10. The method of claim 1, further comprising triggering a first fraud alert based on the first notice.

11. The method of claim 9, further comprising authenticating the terminal device when the terminal device fingerprint matches the reference terminal device fingerprint.

12. The method of claim 9, wherein the reference terminal device fingerprint is determined based on identification information of the registered terminal device.

13. The method of claim 9, further comprising:
   receive location information of the terminal device and positioning data of a geographical positioning system;

determining a transmitter fingerprint of a transmitter of the geographical positioning system based on the positioning data;
determining a reference transmitter fingerprint based on the location information;
determining whether the transmitter fingerprint matches the reference transmitter fingerprint; and
generating a second notice when the transmitter fingerprint does not match the reference transmitter fingerprint.

14. The method of claim 13, further comprising triggering a second fraud alert based on the second notice.

15. The method of claim 13, further comprising:
determining a reference transmitter of the geographical positioning system corresponding to the location information; and
determining the reference transmitter fingerprint based on the reference transmitter.

16. A non-transitory computer-readable medium storing instructions that, when executed by one or more processors of an onboard computer system equipped on a service vehicle registered to provide a transportation service, cause the one or more processors to perform a method for fraud detection, the method comprising:

controlling a communication interface equipped on the service vehicle to establish a short-range communication link with a terminal device associated with a user;
receiving short-range communication signals from the terminal device through the short-range communication link;
determining a terminal device fingerprint based on the short-range communication signals received from the terminal device;
determining whether the terminal device fingerprint matches a reference terminal device fingerprint corresponding to a registered terminal device that is registered to provide the transportation service using the service vehicle; and
generating a first notice when the terminal device fingerprint does not match the reference terminal device fingerprint.

17. The method of claim 13, further comprising:
authenticating the location information when the transmitter fingerprint matches the reference transmitter fingerprint.

* * * * *